(12) United States Patent
Almquist et al.

(10) Patent No.: US 6,284,849 B1
(45) Date of Patent: Sep. 4, 2001

(54) METHOD OF CATALYST TRANSITIONS IN OLEFIN POLYMERIZATIONS

(75) Inventors: Vidar Almquist, Porsgrunn; Tone Aastad, Stathelle; Ingrid Sorum Melaaen, Skjelsvik, all of (NO); Harri Hokkanen, Helsinki; Kalle Kallio, Gammelby, both of (FI)

(73) Assignee: Borealis A/S, Lyngby (DK)

( * ) Notice: Subject to any disclaimer, the term of this patent is extended or adjusted under 35 U.S.C. 154(b) by 0 days.

(21) Appl. No.: 09/142,402

(22) PCT Filed: Mar. 5, 1997

(86) PCT No.: PCT/NO97/00065
§ 371 Date: Jan. 11, 1999
§ 102(e) Date: Jan. 11, 1999

(87) PCT Pub. No.: WO97/32905
PCT Pub. Date: Sep. 12, 1997

(30) Foreign Application Priority Data

Mar. 5, 1996 (NO) .................................... 960898

(51) Int. Cl.⁷ ................ C08F 2/38; C08F 4/16; C08F 4/22
(52) U.S. Cl. ............ 526/82; 526/89; 526/160; 526/943; 526/113; 502/152
(58) Field of Search ..................... 526/161, 170, 526/171, 172, 160, 89, 113, 943, 82

(56) References Cited

U.S. PATENT DOCUMENTS

| 4,460,755 | 7/1984 | Williams et al. . |
| 5,672,666 | * 9/1997 | Muhle et al. ..................... 526/82 |

FOREIGN PATENT DOCUMENTS

| 0 107 105 | 2/1984 | (EP) . |
| 0 471 497 | 2/1992 | (EP) . |
| 0 531 834 | 8/1992 | (EP) . |
| 0 558 987 | 2/1993 | (EP) . |
| 0 604 993 | 7/1994 | (EP) . |
| WO 92/14766 | 9/1992 | (WO) . |
| WO 95/26370 | 10/1995 | (WO) . |
| WO 96/39450 | 12/1996 | (WO) . |

* cited by examiner

Primary Examiner—David W. Wu
Assistant Examiner—R. Harlan
(74) Attorney, Agent, or Firm—Scully, Scott, Murphy & Presser

(57) ABSTRACT

A method for transitioning between two different catalysts in olefin polymerizations, a first catalyst and a second catalyst, comprising the steps of: discontinuing the feed of the first catalyst into the polymerization reactor, and introducing the second catalyst into the reactor, wherein the transition is performed between a chromium-based catalyst and a metallocene catalyst.

9 Claims, 6 Drawing Sheets

US 6,284,849 B1

METHOD OF CATALYST TRANSITIONS IN OLEFIN POLYMERIZATIONS

TECHNICAL FIELD

The present invention relates to a method of catalyst transitions in olefin polymerizations, particularly in the operation of an olefin polymerization plant. More particularly, the present invention relates to the transition between chromium-based catalysts and a metallocene catalysts. The transition may be performed without the use of any catalyst deactivating agents.

BACKGROUND ART

During the production of olefin polymers in a commercial reactor it will often be necessary to transition from one type of catalyst system producing polymers having certain properties and characteristics to another catalyst system producing polymers having different specifications. The transition between similar or compatible catalysts generally takes place easily. However, when the catalysts are of different types and/or incompatible the process is typically complicated. For example, to change from a traditional chromium-based catalyst to a metallocene catalyst, or vice versa, normally requires a long transition period. Moreover, the polyolefins produced during this transition period will continuously change in properties. If the transition from one catalyst system to another requires substantial changes in reactor conditions, the risks of encountering production problems and producing polymers having extreme properties are likely.

A transition from a polymerization reaction catalyzed by a first catalyst to a polymerization reaction catalyzed by a second catalyst is usually performed by stopping the polymerization process, empty the reactor, recharge and then introduce the second catalyst into the reactor. Such catalyst changes are time-consuming and costly because a reactor shut-down for an extended period of time is necessary during transition.

However, a polymerization reaction may be inhibited or stopped temporarily or permanently without emptying the reactor in a number of ways.

NO 178 152 discloses a method for deactivating a chromium catalyst which also contains an organometallic compound used in the gas phase polymerization of olefins. A group of suitable deactivating agents comprises oxygen, ammonium, water and carbonmonoxide. The polymerization reaction may be restarted without emptying the reactor by first feeding an organoaluminium compound and subsequently the catalyst.

EP 0 604 993 discloses a method for the restarting of a vapour phase olefin polymerization that has been temporarily shut down. The olefin polymerization, utilizing a Ziegler catalyst, is stopped by introducing a deactivator, such as oxygen, water, carbondioxide, carbonmonoxide, alcohols or ketones. The reaction system is restarted by feeding an organoaluminium compound into the reaction system without discharging the previously formed polymer particles followed by the solid catalyst component.

WO 92/14766 describes the use of one volatile and one non-volatile catalyst killer for metallocene catalysts in a high pressure polymerization process, which is added downstream of the polymerization zone to suppress polymerization of the recycling monomer and the separated molten polymer. For metallocene/aluminoxane-based catalyst systems there may also be used methanol and n-butanol as catalyst killers.

EP 0 531 834 describes a method of preparing a Ziegler-Natta catalyst system that is fed to a prepolymerization reactor where α-olefins, in particular propylene, are prepolymerized. The polymerization is interrupted by introducing gaseous $CO_2$ directly into the suspension or into the reactor head space for 0.5 to 3 h while stirring the suspension. The obtained catalyst system may be stored as a solid and prior to use reactivated by reacting with a cocatalyst, such as triethyl-aluminium, and an electron donor compound. EP 0 558 987 discloses the production of propylene-ethylene copolymers by using this catalyst system.

U.S. Pat. No. 4,460,755 discloses a method of transitioning a continuous olefin polymerization reaction catalyzed by a Ziegler type catalyst into one catalyzed by a chromium-based catalyst, without the need of emptying and recharging the polymerization reactor. The procedure comprises the steps of stopping the catalyst feed, introducing a hydroxyl-containing silica which reacts with the catalyst, and finally introducing a chromium-based catalyst, while maintaining polymerization conditions during the transition.

WO 95/26370 discloses a process for transitioning from a polymerization reaction catalyzed by a Ziegler-Natta catalyst to a metallocene catalyst. This is accomplished by a) discontinuing the feeding of the first catalyst into the reactor, b) introducing a reversible catalyst killer, c) introducing an irreversible catalyst killer, and d) feeding the second catalyst into the reactor. The Ziegler-Natta catalyst comprises silica impregnated with titanium chloride, magnesium chloride and tetrahydrofuran, and organoaluminium compounds. The metallocene catalyst comprises silica mixed with methylaluminoxane and bis-n-butylcyclopentadienyl-zirconiumdichloride and triethylaluminium as a co-catalyst. Only the transition from Ziegler-Natta catalysts to metallocene catalysts are exemplified. Carbonmonoxide (CO) is used as a reversible catalyst killer and water as an irreversible catalyst killer.

In olefin polymerizations chromium oxide-based catalysts are frequently used. Recent catalyst developments have resulted in metallocene catalysts which comprise metallocene compounds of transition metals. These two types of catalysts are presently of great economic importance and therefore a time-saving transition from one of said catalysts to the other in the same polymerization plant would be highly desireable. However, said catalysts are incompatible and a direct transition between them normally is difficult.

SUMMARY OF THE INVENTION

The present invention provides a method for transitioning between two different catalysts in olefin polymerxizations, a first catalyst and a second catalyst. Said method comprises the steps of:

a) discontinuing the feed of the first catalyst into the polymerization reactor, and then b) introducing the second catalyst into the reactor, wherein the transition is performed between a chromium-based catalyst and a metallocene catalyst.

In one embodiment of the present invention subsequent to step a) a deactivating agent in a sufficient amount to deactivate the first catalyst is introduced into the reactor before the second catalyst being introduced into the reactor.

In another embodiment of the present invention the transition is performed in the absence of any catalyst deactivating agent during a continuous polymerization of olefin monomers.

DETAILED DESCRIPTION OF THE INVENTION

Figure 1:
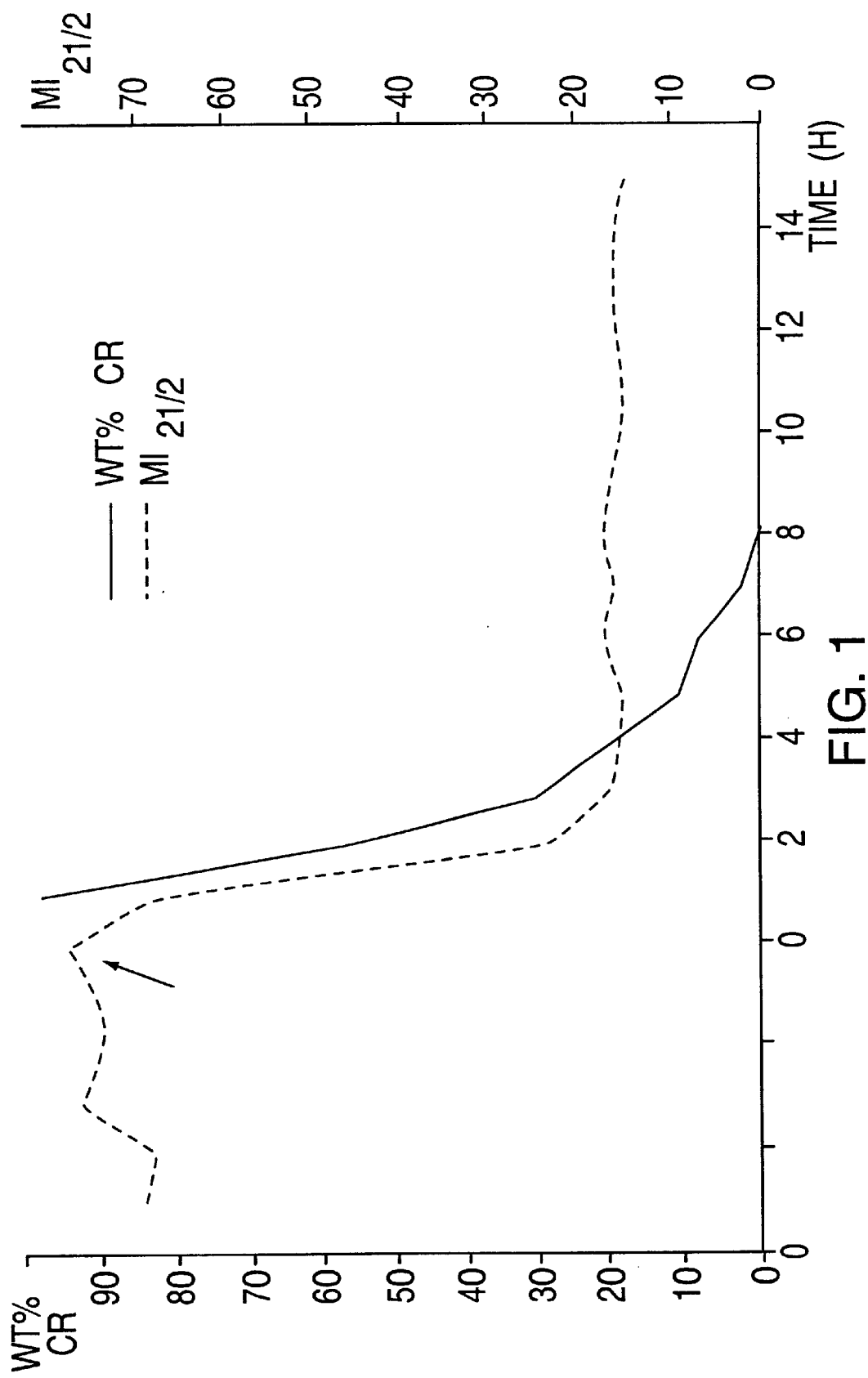
FIG. 1 shows the changes in chromium content and melt flow ratio of polymers produced during the transition from chromium-based to metallocene-based polymerizations without the use of a deactivator.

The present invention relates to a method for the transition between two different or incompatible catalysts, in particular a chromium-based catalyst and a metallocene catalyst used in the polymerization of α-olefins.

Incompatible catalysts have different performances towards molecular weight regulators, such as hydrogen and comonomers. Moreover, they result in different comonomer incorporations and usually their reactivity ratios differs by more than 30%. Such catalysts produce polymers that usually differ in molecular weight by a factor greater than two.

The method of the present invention can be used in a gas phase, solution phase or slurry phase polymerization process. A slurry phase polymerization process is preferred.

A commercial loop reactor polyethylene polymerization process involves mainly five steps: 1) purification of the reactants (ethylene, comonomer, hydrogen) and diluent (e.g. isobutane); 2) polymerization in said liquid diluent; 3) separation of produced polymer fluff from the diluent and excess monomer; 4) drying the polymer fluff; and 5) pelletizing the fluff.

Catalysts intended for use in such a process has to satisfy several process demands. They have to be completely insoluble in the polymerization medium, e.g. isobutane, and they must produce polymers having a controlled morphology. Further, the amount of soluble polymer that can cause reactor fouling must be low, and also a low slurry viscosity should be maintained to keep the heat transfer coefficient high. Finally, the activity of the catalyst must be high to obtain sufficient productivity. Both the chromium catalyst and the metallocene catalyst used in the present invention fulfil these requirements.

Chromium-based catalysts have been used for a long time in the polymerization of α-olefins, and in particular ethylene. They contain several different active sites, and as a result all polymer chains become different. The comonomer, such as lower alkenes, e.g. hexene, is unevenly distributed, mostly as short chains. As a result, these catalysts give polymers having a broad molecular weight distribution.

Metallocene catalysts, often called single site catalysts (SSC), include metallocene compounds of transition metals. A suitable class of metallocene catalysts used in this invention have the formula:

wherein Cp is an unsubstituted or substituted and/or fused homo- or hetero-cyclopentadienyl, R is a group of 1–4 atoms connecting two Cp rings, M is a transition metal of group 4A, 5A or 6A in the periodic system of elements, R' is a hydrocarbyl or hydrocarboxyl group having 1–20 carbon atoms, and X is a halogen atom, and wherein m=1–3, n=0 or 1, o=0–3, p=0–3, and the sum m+n+p+o equals the oxidation state of M, and the metallocenes may also contain bridged structures. Among preferred metallocene compounds are bis(cyclopentadienyl)titaniumdialkyl or bis(cyclopentadienyl)zirconiumdialkyl or chlorides thereof. In addition to the metallocene catalyst, an activator component may be used, typically aluminoxan or an ionic activator. In the metallocene catalysts all active sites are equal, which results in similar polymer chains. The polymers obtained by these catalysts have a narrow molecular weight distribution and the used comonomer, e.g. hexene, is evenly distributed.

When a polymerization reaction catalyzed by a first catalyst is to be changed to a polymerization reaction catalyzed by a second catalyst which is incompatible with the first catalyst several methods of performing the transition are available. One possibility is to kill the existing polymerization reaction, empty the reactor, recharge and start again with a new catalyst. The benefit of this procedure is that the amount of remaining material in the plant from the previous run will be small. A disadvantage is that it takes several hours to build up a desired level of solids inside the reactor. Besides that, in any process equipment there will always remain traces of "old" material, and which is practically impossible to clean away.

Another possibility is to make a "flying" transition where the change from one type of produced polymer to another is continuous, that is without interrupting the polymerization reaction. When transitioning from a first to a second catalyst the initial step is to discontinue the catalyst feed. The new catalyst is then introduced and, if necessary, the reactor conditions are adapted to the conditions required by the new catalyst. In the case of transition from a chromium catalyst, the transition is followed by IR measurements on the produced polymer to determined when the system is free from any chromium-based polymer, i.e. to determine when the produced polymer is within the metallocene polymer specifications. The transition can also be followed by melt index measurements of the produced polymer fluff.

The results of such analysis during a "flying" transition from a chromium-based catalyst to a metallocene catalyst are disclosed in the acompanying FIG. 1. The solid line indicates the decline in the chromium content of the produced polymers during the transition period, where the chromium content of the polymers at start of the transition is taken as 100%. The dotted line indicates the melt flow ratio of the polymer fluff. The melt flow ratio, MFR, is the ratio between the melt indices determined with 2.16 kg and 21.6 kg loads, respectively. The MFR is also an indication of the molecular weight distribution of the polymer, and the plot shows that a chromium-based polymer has a much broader molecular weight distribution than a metallocene-based polymer. When the transition starts the MFR is approximately 75, and when the transition is complete it is approximately 15. It can be seen that the transition period takes nearly eight hours from the moment of discontinuing the feed of the chromium catalyst until chromium is no longer present in the polymer fluff.

The specific reactor conditions depend i.a. on catalyst activity, type and amount of comonomer, type of polymer to be produced, and the production equipment. Consequently, the specific conditions during transition between chromium and metallocene catalysts have to be determined for each specific product in a particular plant. However, in general the reactor conditions when using metallocene catalysts include a reduced feed of comonomer because the comonomers are much more uniformly incorporated in metallocene catalyzed polymers than in chromium catalyzed polymers of equal polymer density. The melt flow index is corrected by introducing hydrogen, and also, to a certain degree, ethylene. With metallocene catalysts the changes in reactor parameters give a much faster response than with chromium catalysts.

The polymer fluff obtained by the use of metallocene catalysts has a particularly good morphology and a very small amount of fines. This is very beneficial for the filtering of the overhead gas phase from the flash drum. Moreover, it is unproblematic to keep a high solid content in the reactor, typically at an average level of greater than 36% by weight, and also an average settling efficiency greater than 50% by weight can easily be obtained.

The "flying" transition from the metallocene catalyzed polymerization to the chromium catalyzed polymerization takes a shorter time than the other way. It is believed that this is due to the different shape of the polymer fluff particles. The spherical shaped fluff produced by metallocene catalysts is easier to remove from the reactor than the chromium polymer flakes which have a more pronounced tendency to stick to the walls of the reactor.

While the "flying" transition according to the present invention is performed without the use of any deactivating agent, a time-saving and more efficient route of transition is to deactivate the catalyst before changing to a second catalyst. In general, such a transition procedure is started by discontinuing the feed of the first catalyst and then introduce a deactivating agent into the reaction medium to kill or inhibit the catalytic acitivity of the first catalyst. As a result, the polymerization reaction will stop completely. The second catalyst is then introduced and the polymerization reaction will restart. An organometallic compound that reacts with the remaining components of the catalyst deactivator may also be introduced into the reaction medium to protect the second catalyst from being deactivated.

During the transition all catalytic components involved will become exposed to the same reaction medium. Consequently, the agent intended to deactivate the first catalyst will also come into contact with the second catalyst and must not devastate or hamper the activity of this second catalyst. For chromium-based catalysts a suitable deactivating agent which does not inhibit the metallocene can be found among polar hydrocarbons, such as i.a. alcohols, glycols, phenols, ethers, ketones, aldehydes, carboxylic acids, etc. Also oxygen and water may be used to deactivate chromium-based catalysts. A suitable group of polar hydrocarbons are lower alcohols, among which isopropanol is found to have a particularly desireable effect. Isopropanol kills the chromium catalyst immediately, and in appropriate concentrations it has no unfavourable influence on the activity of the metallocene catalyst.

Figure 2:
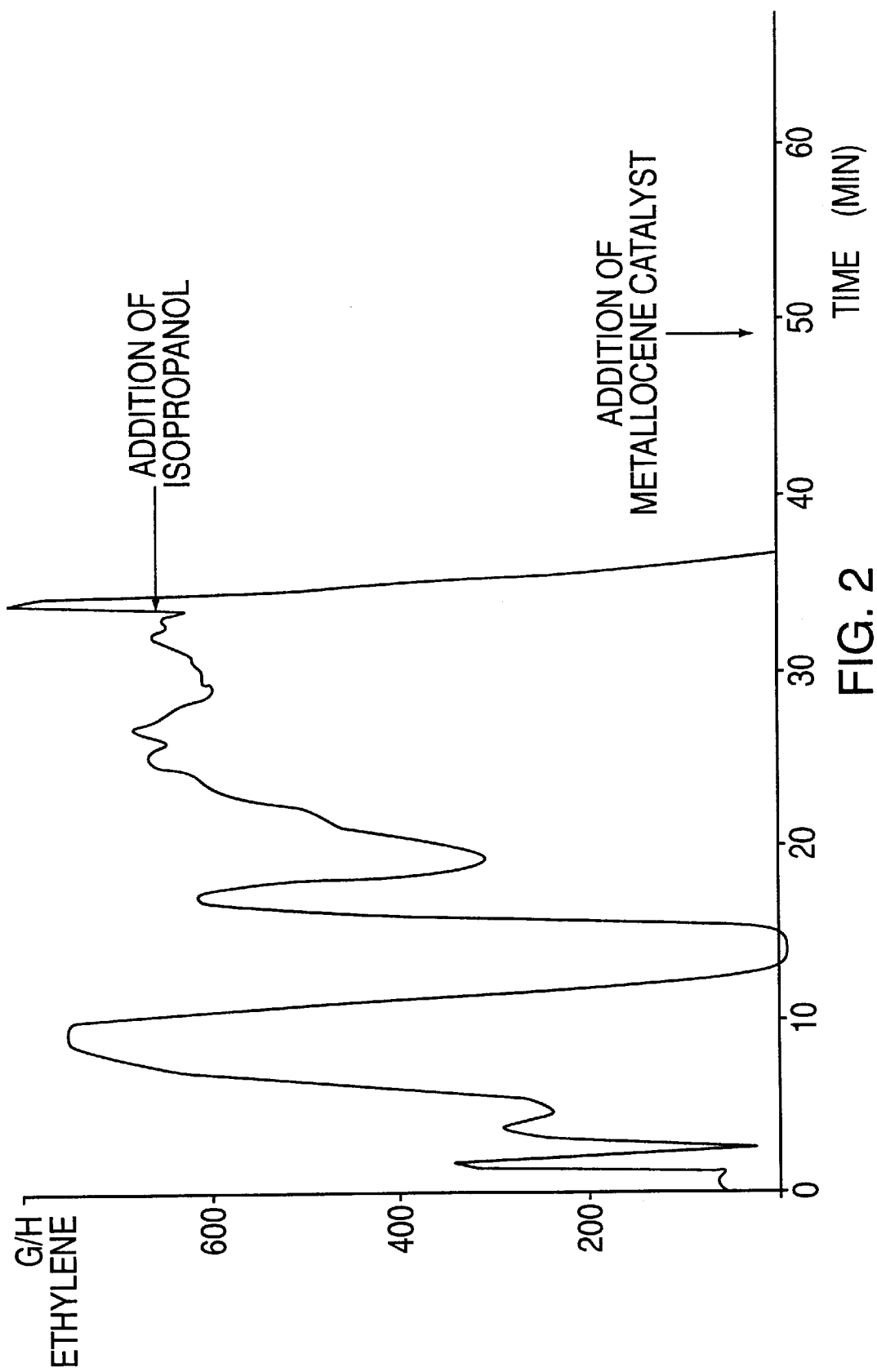
FIGS. 2, 3 and 4 show the ethylene consumption vs. time during the transition from a chromium-catalyzed polymerization to a metallocene-catalyzed polymerization, where the chromium-based catalyst is killed with a large, moderate and small amount of isopropanol, respectively.
Figure 3:
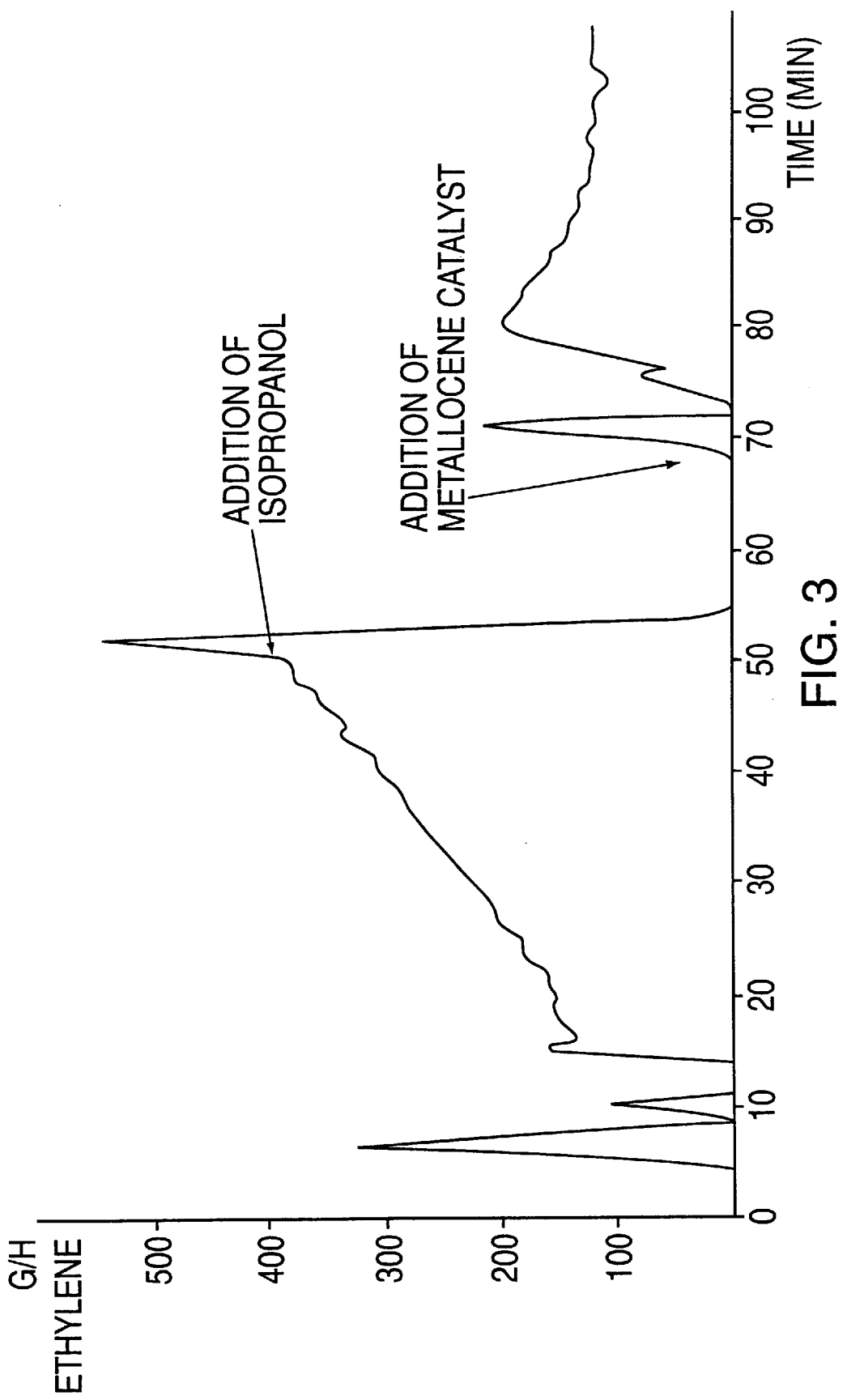
Figure 4:
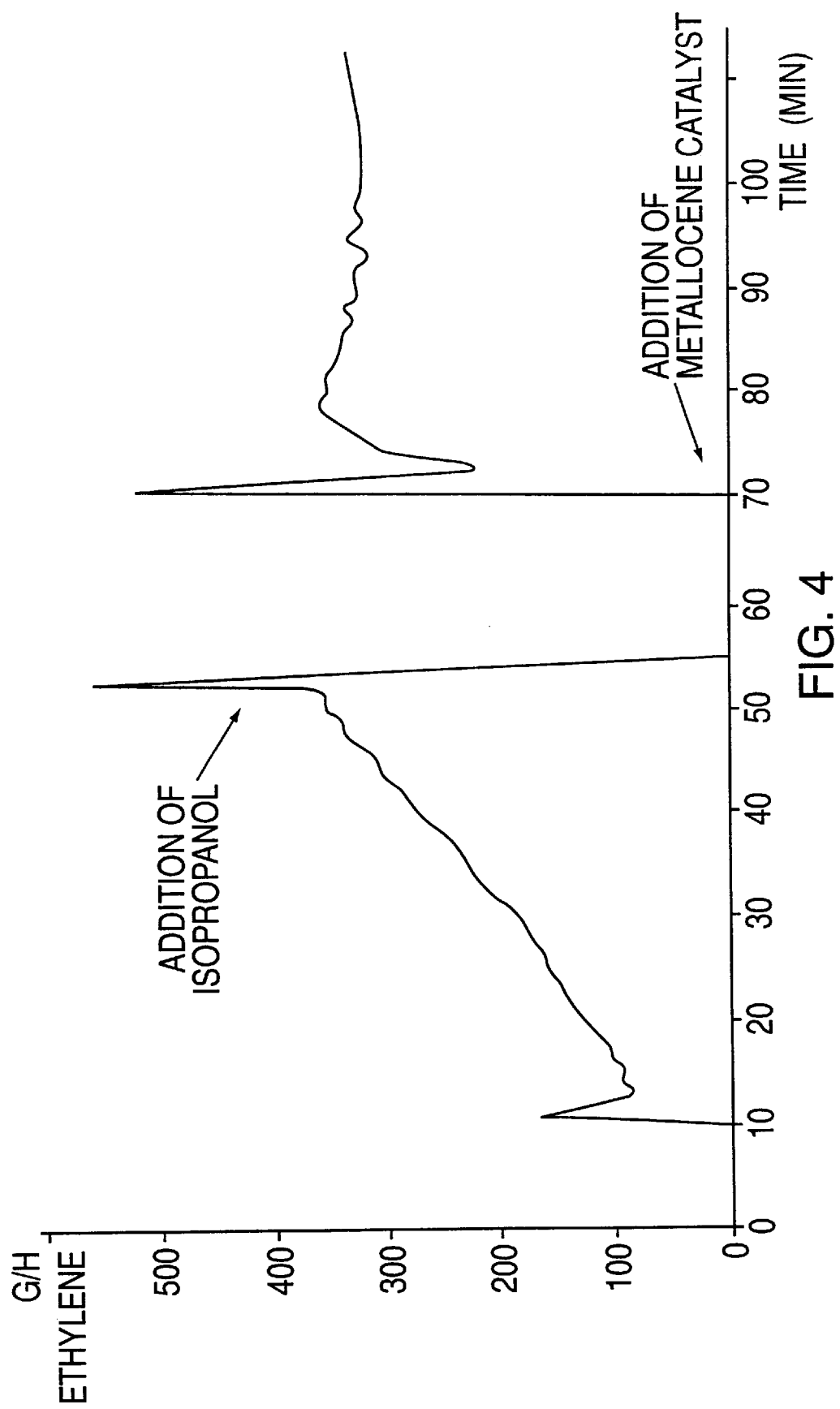

This is demonstrated in the accompanying FIGS. 2 to 4 where isopropanol is used as a killer for a chromium catalyst. The figures indicate the ethylene consumption in a polymerization reaction during the transition from a chromium-based polymer to a metallocene-based polymer. A suitable amount of isopropanol injected into the reaction medium have as a result that the ethylene consumption immediately drops to zero and does not recover, i.e. the chromium catalyst is completely inactivated.

In the experiment recorded in FIG. 2 isopropanol (IPA) is added in an amount equal to a molar ratio between isopropanol and chromium of IPA:Cr=1:1. The plot shows that also the metallocene injected into the reaction medium 15 minutes later is killed, as no further polymerization was observed.

FIG. 3 is a plot analogous to FIG. 2, except that the injected amount of isopropanol corresponds to a molar ratio of IPA:Cr=0.25:1. When metallocene is added 15 minutes later the polymerization restarts, but at a lower activity level than before.

FIG. 4 is another plot analogous to FIGS. 2 and 3, except that the injected amount of isopropanol is smaller and corresponded to a molar ratio of IPA:Cr=0.1:1. The chromium-based catalyst was killed immediately as above, but upon injection of metallocene the polymerization restarts and gains normal activity in a few minutes.

These results verify that isopropanol is a suitable killing agent in the transition from a chromium-based catalyst to a metallocene catalyst. In the present invention isopropanol is used as an example. Other similar polar hydrocarbons may be used instead, as will be obvious to persons skilled in the art.

For metallocene catalysts suitable deactivating agents are CO or $CO_2$. However, the concentrations of CO that are needed to kill the metallocene catalyst will also kill the chromium-based catalyst, and hence CO must be avoided. On the other hand, $CO_2$ is a poison to metallocene catalysts in concentrations where it has no significant influence on the activity of the chromium catalyst. $CO_2$ is therefore a preferred deactivating agent for the metallocene catalyst and may be introduced into the reaction medium as a gas.

Figure 5:
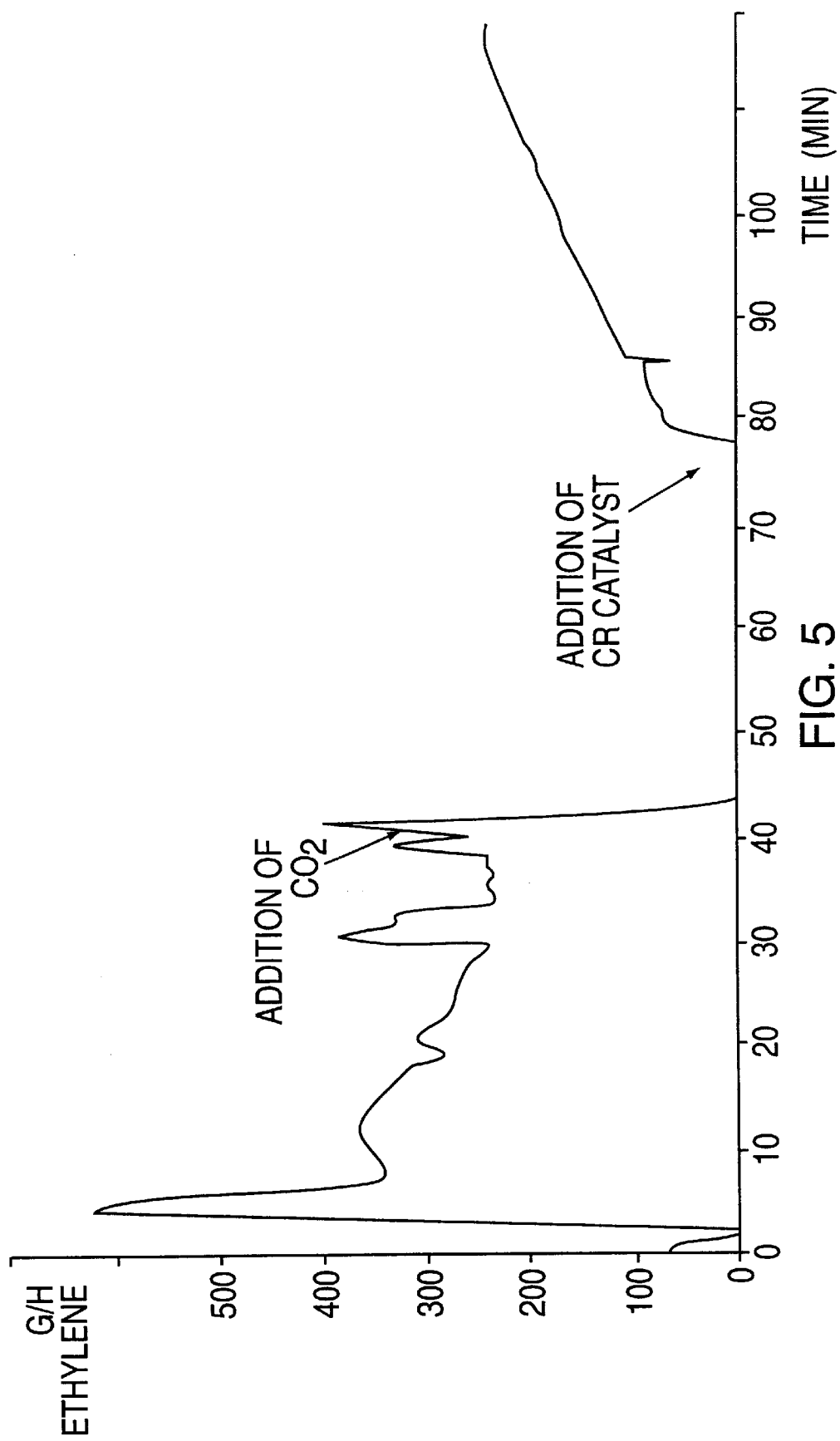
FIG. 5 shows ethylene consumption vs. time during the transition from a metallocene-catalyzed polymerization to a chromium-catalyzed polymerization, where the metallocene catalyst is killed with $CO_2$.

The accompanying FIG. 5 shows the ethylene consumption during the transition from a metallocene catalyst to a chromium-based catalyst where the metallocene catalyst is killed with a suitable amount of $CO_2$ injected into the reaction medium. The polymerization halts immediately, i.e. there is no further ethylene consumption. When the chromium catalyst is introduced into the reaction medium the polymerization reaction restarts and the activity increases gradually to the previous level.

Figure 6:
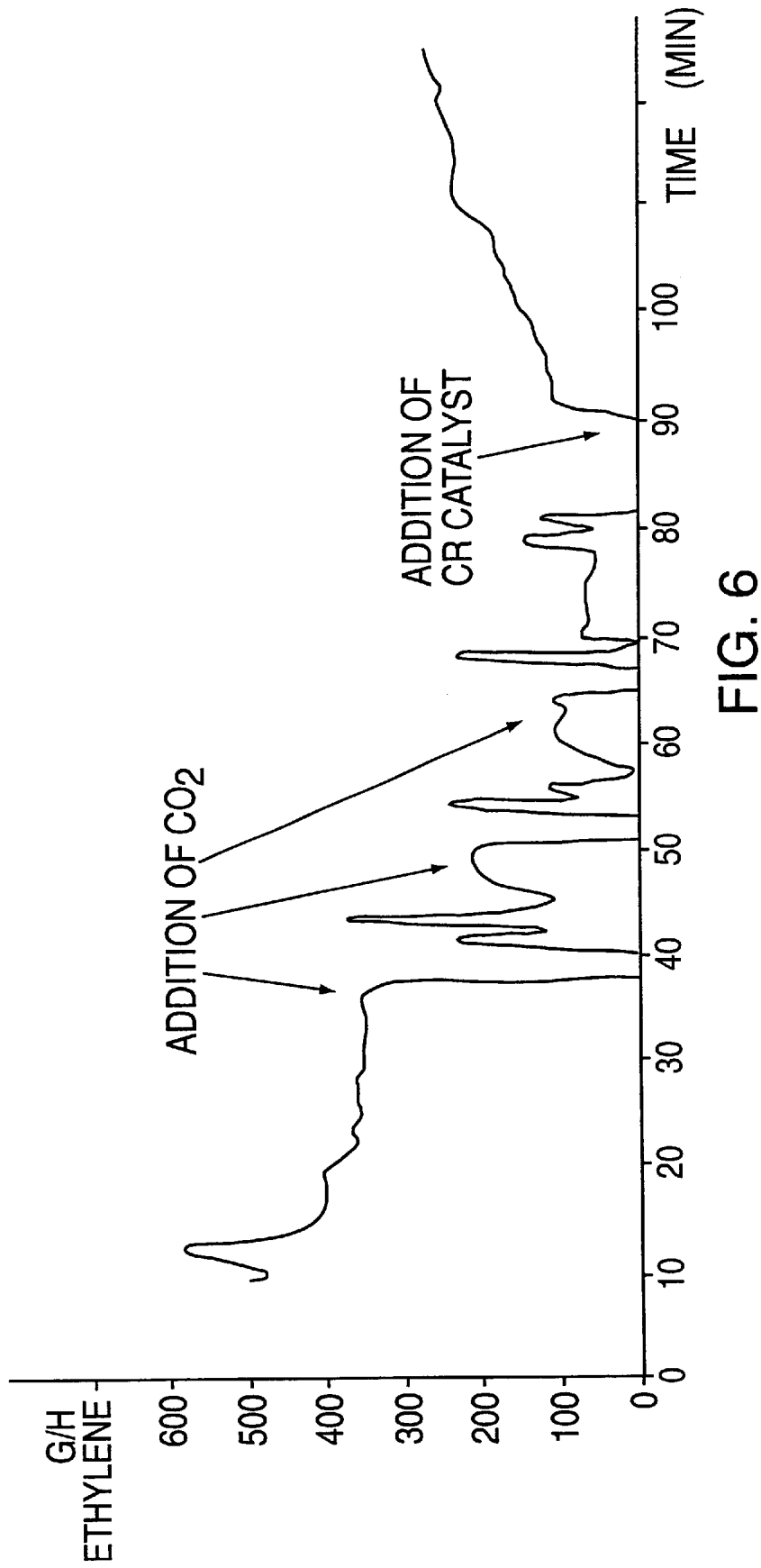
FIG. 6 shows the ethylene consumption vs. time during the transition from a metallocene-catalyzed polymerization to a chromium-catalyzed polymerization, where the metallocene catalyst is deactivated with a number of minor portions of $CO_2$.

The degree of deactivation of the metallocene depends on the injected dosage of $CO_2$. If the added amount of $CO_2$ instead of being injected as one portion is divided into a number of minor portions the metallocene will become deactivated, but not killed. This fact is demonstrated in the accompanying FIG. 6 where the amount of $CO_2$ in FIG. 5 is divided into three equal portions and injected at intervals. Upon each injection of $CO_2$ the polymerization activity falls to zero, but regains after a couple of minutes, though each time at a lower activity level than before. Obiously, the concentration of $CO_2$ in the reaction medium is important. Thus, an instant injection of a certain amount of $CO_2$ is more efficient than introducing the same amount dispersed for instance in the monomer feed fed to the reactor.

The invention will now be explained in more detail by the use of examples.

EXAMPLES

In the polymerizations exemplified below two types of catalysts were used, i.e. a supported metallocene catalyst and a Phillips type chromium catalyst. Said catalysts were prepared as follows:

Preparation of Supported Metallocene Catalyst

An amount of 838 g bis(n-butylcyclopentadienyl) zirconium dichloride was dissolved in 21.3 kg of toluene, then 81.5 kg of 30% metylaluminoxane (MAO) in toluene (13,7% Al) was added to the obtained metallocene/toluene solution at 20° C. This complex solution containing metallocene and MAO was mixed for 2 hours at 20° C. in a mixing tank. An amount of 75.5 kg of "SYLOPOL 55 SJ" silica activated at 600° C. for 4 hours was loaded into the catalyst preparation vessel and the impregnation of the complex solution onto silica started. The complex solution was fed to the vessel in 2 hours to avoid that the temperature should exceed 30° C. The mixing was continued for further 2 hours to complete the reaction. The catalyst was dried for 6 hours in a stream of nitrogen, and then in vacuum at 40° C. until the toluene content of the catalys was less than 1% by weight.

Activation of Chromium Catalyst

A commercially available Phillips type chromium-based catalyst was activated in a fluidized bed at 860° C. for 10 h in air. After activation the catalyst was cooled in a flow of nitrogen and stored in an inert atmosphere. The catalyst contained 1.04% by weight of chromium and 3.74% by weight of titanium.

Example 1

This example describes the transition from a chromium-based catalyst to a metallocene catalyst in the polymerization of ethylene, where the chromium-based catalyst is killed with isopropanol.

An ethylene polymerization was performed in a 3 $dm^3$ stainless steel autoclave reactor equipped with a paddle stirrer. An amount of 1.8 $dm^3$ dried and deoxygenated isobutane used as the polymerization medium was charged to the reactor which had previously been dried at 100° C. in vacuum and then purged with nitrogen. An amount of 104 mg chromium catalyst was weighed into a metal cylinder in a glove box. The cylinder containing the catalyst was connected to the reactor, and the catalyst was fed to the reactor with nitrogen. The reactor was heated to 94° C. and ethylene introduced into the reactor until an ethylene partial pressure of 10 bar was reached. The total pressure was kept constant by the feeding of ethylene. The polymerization was continued for 35 minutes and then terminated by adding 0.02 mmole isopropanol (IPA) dissolved in 3 $cm^3$ of dried and deoxygenated n-pentane. The ethylene consumption stopped immediately and the polymerization reaction did not recover during the next 10 minutes. An amount of 145 mg of the supported metallocene catalyst was added from a metal cylinder by the use of pressurized nitrogen. The polymerization reaction did not start. The molar ratio IPA/Cr equaled 1. The results of this experiment are plotted in FIG. 2.

Example 2

The experiment of example 1 was repeated, except, that a reduced amount of isopropanol was injected. The polymerization was performed as in Example 1, except that 95 mg of the chromium catalyst was used. After 50 minutes 0.005 mmole of isopropanol (IPA) in 3 $cm^3$ of n-pentane was added. The reaction died and did not recover during the next 10 minutes. Then 166 mg of the supported metallocene catalyst was added to the reactor and the polymerization reaction restarted with an ethylene consumption of 100 g/h. The molar ratio IPA/Cr was 0.25. The results of this experiment are plotted in FIG. 3.

Example 3

The experiment of example 2 was repeated, except that the amount of isopropanol injected was further reduced. The polymerization was performed as in example 1, except that it was used 114 mg of the chromium catalyst. After 50 minutes 0.002 mmole of isopropanol (IPA) in 3 $cm^3$ of n-pentane was added. The reaction died and did not recover during the next 10 minutes. Then 162 mg of the supported metallocene catalyst was added to the reactor and the polymerization reaction restarted with an ethylene consumption of 350 g/h. The molar ratio IPA/Cr was 0.1. The results of this experiment are plotted in FIG. 4.

Example 4

This example describes the transition from a metallocene catalyst to a chromium-based catalyst in the polymerization of ethylene, where the metallocene catalyst is killed with $CO_2$ and then the polymerization reaction restarted by introducing the chromium catalyst.

A polymerization was performed in the autoclave reactor of example 1 at 94° C. and 10 bar ethylene pressure. The polymerization was started using 124 mg of the supported metallocene catalyst. After 40 minutes 15 $cm^3$ of $CO_2$ (of normal pressure) was added. The ethylene uptake stopped and did not recover during the next 20 minutes. Then 120 mg of the chromium catalyst was added and the polymerization reaction restarted after some minutes. The results of this experiment are plotted in FIG. 5.

Example 5

This example describes the transition from a metallocene catalyst to a chromium-based catalyst in the polymerization of ethylene, where the metallocene catalyst was deactivated with $CO_2$ before the polymerization reaction was restarted by introducing the chromium catalyst.

A polymerization was performed as in Example 4, except that a quantity of 126 mg of the supported metallocene catalyst was used. After 40 minutes 5 $cm^3$ of $CO_2$ (of normal pressure) was added. The ethylene uptake was lowered, but did not stop completely. Then after 15 minutes another 5 $cm^3$ of $CO_2$ was added, but still the reaction was not killed. After 15 minutes another 5 $cm^3$ of $CO_2$ was added, but still the reaction was not completely killed. Then 128 mg of the chromium catalyst was added and the polymerization restarted, which could be seen from the polymerization kinetics which showed an increase in ethylene consumption. The results of this experiment are plotted in FIG. 6.

Example 6

This example describes a pilot plant polymerization of ethylene by the use of a metallocene catalyst, and the deactivating thereof by introducing $CO_2$ in the monomer feed.

A pilot plant loop reactor having a volume of 500 $dm^3$ was operated at 80° C. Isobutane, ethylene and hexene were fed into the reactor so that the ethylene content in the flash gas was 6.5 mole %, the hexene to ethylene molar ratio was 70:1000 and the residence time of the polymer in the reactor was 1 hour. The metallocene polymerization catalyst was fed into the reactor at a rate of 15 g/h to maintain a production level of 26 kg PE/h.

Carbon dioxide was introduced into the ethylene feed in a concentration of not greater than 0.4 ppm $CO_2$. As a result the polymer production rate decreased during a period of two hours from 26 kg/h to 14 kg/h, at which level it stabilized. As soon as the feed pf $CO_2$ was discontinued the prodiction rate recovered, reaching 30 kg/h within a period of 2 hours. The results of this experiment verifies the results obtained in the laboratory experiment of example 5.

Example 7

A polymerization was performed as described in Example 6. Then 1000 mg of $CO_2$ was injected into the polymerization reactor during a period of 5 minutes. The reaction was extinguished instantaneously and no reaction could be observed one minute after the opening of the $CO_2$ valve. The results of this experiment verifies the results obtained in the laboratory experiment of example 4.

Example 8

This example describes transitions from chromium to metallocene to chromium catalyzed polymerizations in a commercial scale reactor, performed without deactivating the catalysts.

In a full scale 55 m³ slurry loop reactor ethylene with hexene as comonomer were polymerized at 94° C. by the use of the chromium-based catalyst specified above. The produced polyethylene had a melt index of $MFI_2=0.2$ g/10 min and a density of d=940 g/dm³.

The transition procedure was started by discontinuing the chromium catalyst feed and reducing the reactor temperature from 94° C. to 85° C. before starting the metallocene catalyst feed. The transition period lasted for 6 hours, in which period about 80 tons of transition material was produced. In the end the metallocene catalyzed product had a melt index of $MFI_2=6$ g/10 min and a density of d=934 g/dm³.

During the transition period both metallocene and chromium catalyzed polymers were produced. This transition material was not suited for injection moulding nor film processing because the two polyethylene mix components had very different melt viscosities.

After a production campaign of about 600 tons metallocene-based polyethylene the transition back to chromium-based catalyst was started. The reactor temperature was increased to 94° C. while still producing on metallocene. The metallocene feed was stopped and a chromium feed established. After about a 3 hour transition period the produced polymer complied with the specifications of the initially produced chromium-catalyzed polymers.

Thus, the transition period from metallocene to chromium-based catalyst was significantly shorter than the transition period from chromium-based catalyst to metallocene.

Example 9

The procedure of Example 8 was followed. Three separate catalyst feeding containers linked to the reactor were charged with two chromium-based silica-supported catalysts and one metallocene catalyst, respectively. The catalysts were commercially available and similar to those used in Example 8. The polymerization process was started with the use of one of said chromium-based catalysts, and at 92° C. and steady state conditions it was produced a polyethylene having a melt index of $MFI_{21}=13$ g/10 min and a density of d=937 g/dm³.

The feeding of the chromium-based catalyst was stopped and the feeding of the metallocene catalyst immediately started at the same reactor conditions. The reactor temperature was kept at 92° C. and the hydrogen and hexene comonomer feed was adjusted to obtain a metallocene-based polyethylene of grade A. About 4 hours from the start of the transitioning the polymer matrix contained more than 90% of metallocene-based polyethylene. The obtained polyethylene had a $MFI_2=2$ g/10 min and d=934 g/dm³. The transitioning process was closely followed by frequently infrared (IR) and rheology analyses. The most economical conditions for producing this polyethylene of grade A was then established and a commercial quantity produced.

The polymerization conditions were then altered to obtain a metallocene-based polyethylene of grade B having a $MFI_2=6$ g/10 min and d=940 g/dm³. The most convenient conditions were established and a commercial quantity produced.

The metallocene catalyst feed was then stopped, the reactor temperature adjusted to 98° C. and the second chromium-based catalyst introduced into the reaction medium. After only 2 hours the reactor conditions were in a steady state and no metallocene-based polymer was left in the reactor. A prime chromium-based polyethylene was then produced, having a $MFI_2=0.25$ g/10 min and d=945 g/dm³.

This example verifies that it is possible during a continuous steady state polymerization of ethylene to transition from a chromium-catalyzed polymerization to a metallocene-catalyzed polymerization, and vice versa, without the use of any deactivating agent. This example also shows that the transition is not dependent on the use of one specific type of chromium or metallocene catalyst. When comparing with Example 8, it can be seen that by adjusting the reactor conditions, the transition periods can be shortened. Optimal conditions have to be determined by practical experiments for each specific reactor and catalyst system used, as will be well known to any person skilled in the art.

What is claimed is:

1. A method of transitioning between two different catalysts in a olefin polymerization comprising the steps of:
   a) feeding a chromium-based catalyst into an olefin polymerization reactor;
   b) discontinuing said feed of said chromium-based catalyst into said polymerization reactor;
   c) introducing a deactivating agent selected from the group consisting of alcohols, water and oxygen into said polymerization reactor to stop said olefin polymerization reaction or, optionally, kill said chromium-based catalyst; and
   d) introducing a metallocene catalyst into said reactor.

2. The method of claim 1 wherein said deactivating agent is an alcohol.

3. A method of transitioning between two different catalysts in an olefin polymerization comprising the steps of:
   a) feeding a first chromium catalyst into an olefin polymerization reactor;
   b) discontinuing said chromium catalyst feed into said polymerization reactor; and
   c) feeding a metallocene catalyst into said continuous reactor, with the proviso that no deactivating agent is introduced into the reactor.

4. The method of claim 3 including the additional steps of:
   d) discontinuing said feed of said metallocene catalyst into said polymerization reactor; and
   e) feeding a second chromium catalyst into said polymerization reactor.

5. The method of claim 3 wherein said method is employed in a continuous olefin polymerization utilizing a continuous olefin polymerization reactor.

6. The method of claim 4 wherein said method is employed in a continuous olefin polymerization utilizing a continuous olefin polymerization reactor.

7. The method of claim 2 wherein said alcohol deactivating agent is isopropanol.

8. The method of claim 7 wherein said isopropanol is introduced into said reactor in an amount such that the molar ratio of isopropanol to chromium is no greater than 0.25.

9. The method of claim 7 wherein said polymerization reaction is restarted by said introduction of said metallocene catalyst into said reactor.

* * * * *